Figure 1:
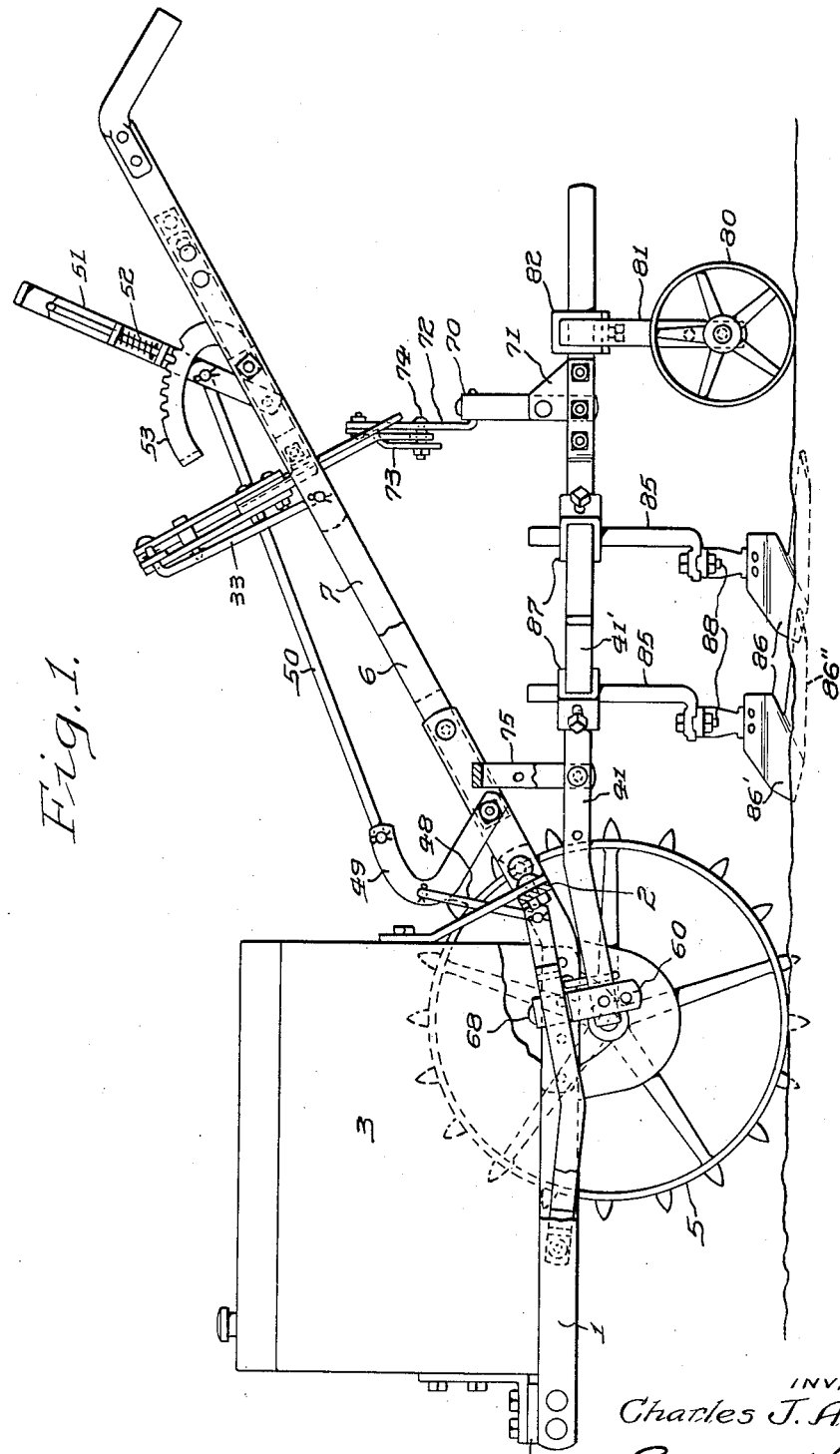

March 6, 1934.    C. J. ALLEN    1,950,023
AGRICULTURAL IMPLEMENT
Filed Jan. 3, 1933    3 Sheets-Sheet 1

INVENTOR
Charles J. Allen,
BY
ATTORNEY

WITNESS

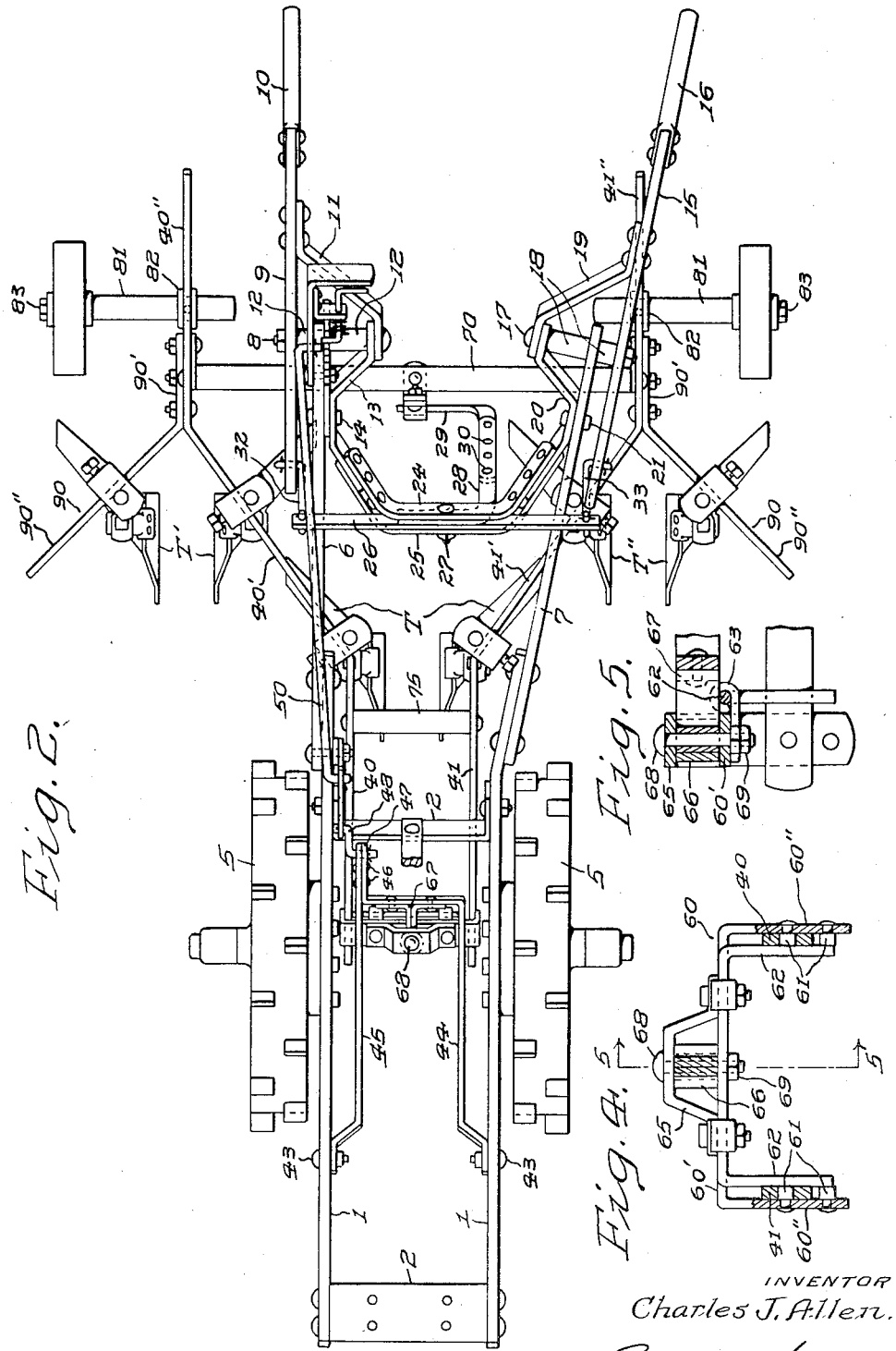

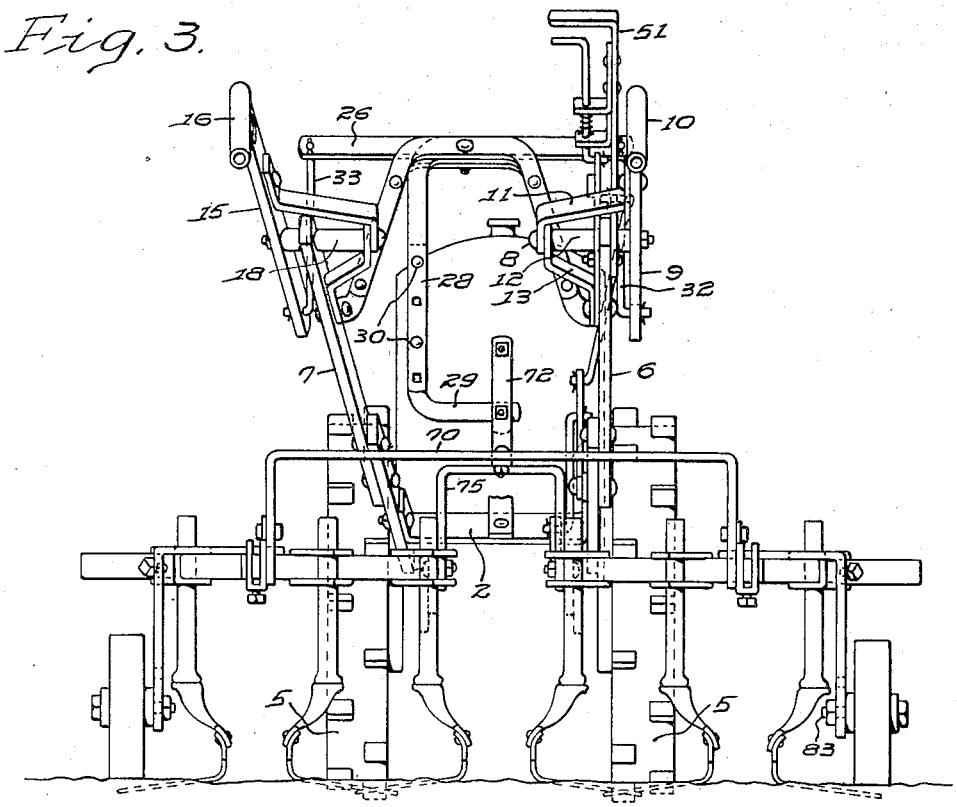
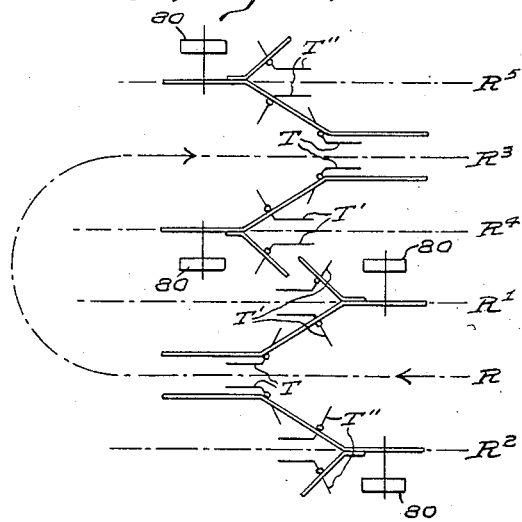
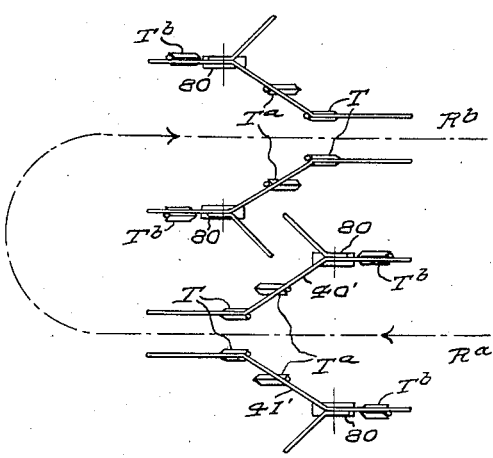

Patented Mar. 6, 1934

1,950,023

UNITED STATES PATENT OFFICE 1,950,023

AGRICULTURAL IMPLEMENT

Charles J. Allen, Moorestown, N. J., assignor to S. L. Allen & Co., Inc., Philadelphia, Pa., a corporation of Pennsylvania Application January 3, 1933, Serial No. 649,792

6 Claims. (Cl. 97—48)

The present invention relates to that class of agricultural implements which comprise in operative combination and association a two-wheeled garden or like non-stable tractor and a tool carrying frame interconnected therewith affording operative support thereto whereby as the tractor moves forward over the ground the frame is drawn after it, and is particularly directed, among other things, to the provision of improved means for connecting the frame with the tractor and for controlling its position during the cultivating operations for which the implement is primarily intended.

The invention also comprehends improvements in the tool carrying frame itself whereby the cultivating tools may be so arranged with relation to the frame as to properly effect simultaneous cultivation of one row of plants or of a plurality of rows thereof in each traverse of the implement across the field, as well as like cultivation of the next adjacent rows when the implement is turned about and moved in the opposite yet substantially parallel direction.

The invention further comprehends the general improvement of agricultural implements of the class to which it relates with the object of facilitating their use in cultivating operations by enhancing the ability of the operator to easily and accurately effect the initial adjustment of the machine for any given job and thereafter, while the cultivating operation is in progress, to accurately regulate the depth to which the tools enter the ground and guide them properly with respect to the plant rows so as to bring about adequate and proper cultivation of the latter without damage to the plants and with a minimum of fatigue and effort.

Other objects, advantages and novel features of design, construction and arrangement comprehended by the invention are hereinafter more particularly pointed out or will be apparent from the following description of a preferred embodiment thereof as illustrated in the accompanying drawings.

In the said drawings, Fig. 1 is a side elevation of the implement with certain parts broken away for the sake of clearness and with others, not necessary for adequate comprehension of the invention, omitted or shown in a diagrammatic way. Fig. 2 is a top plan view of the machine shown in Fig. 1 with the motor omitted and ground working tools adjusted to effect simultaneous cultivation of three parallel rows of plants. Fig. 3 is a rear elevation thereof, and Figs. 4 and 5 are enlarged fragmentary views, partially in elevation and partially in section, of certain details of the implement. Figs. 6 and 7 are diagrammatic views designed to facilitate an understanding of the different ways of setting the tools in accordance with the number of rows which are to be cultivated as the machine is moved across the field and then returned in a parallel course to a point adjacent that from which it started. Throughout the drawings, similar characters of reference are used to designate corresponding parts in the several figures.

Broadly considered, the implement may be regarded as including a tractor and a tool carrying frame, with which are associated the ground working tools and suitable supporting wheels, interconnected with and drawn by the tractor by means hereinafter described. More particularly, the machine comprises a main frame having parallel generally horizontally extending side members 1, 1 connected by one or more cross members 2, upon which in any suitable way is mounted an internal combustion motor generally designated as 3, which may be of any suitable type. The frame is supported on ground wheels 5, 5 located on opposite sides thereof and rotatable on suitable axles (not shown); through interconnection with the motor by any suitable driving means, they also form the propelling means for the implement as a whole in a manner common in the art. The frame is thus capable of vertical rotative movement about the axis of the wheels and is thus, in the absence of the tool carrying frame, of unstable character. Since the details of construction and arrangement of the said driving means form no part of the present invention, illustration thereof or further reference thereto herein would be superfluous as said means, as well as the motor, may be of any form and construction adapted for the performance of their intended functions.

The rear ends of the side frame members are turned angularly upward and provided with rearwardly and upwardly directed extensions 6, 7 which, with the frame members, are desirably formed of flat bar stock and may be either integral with the former or made separate therefrom and secured thereto as shown. Preferably, the extension 6 at the right hand side of the machine when viewed from the rear, extends parallel to the adjacent frame member, while that part of the frame member to which the other extension 7 on the left hand side is secured is bent angularly outward whereby, as clearly shown in Fig. 2, the extension 7 is angularly offset to the left. Adjacent its rear end, the extension 6 is drilled for the passage of a pivot bolt 8 on the outer end of which is mounted a steering handle 9 provided at its rear end with a hand grip 10. Secured to the handle between the hand grip and the pivot bolt is an inwardly offset bracket 11, drilled at its free end for the passage of the bolt so that in effect, the handle is given a two point bearing on the latter, spacing sleeves 12 being disposed about the bolt on opposite sides of the extension 6 to prevent end play. Another outwardly offset bracket 13 is extended forwardly from a point on the bolt adjacent the end of the bracket, is secured to the extension 6 by a bolt or rivet 14, and beyond the latter is turned angularly inward for a purpose to be hereinafter described. It is thus apparent that the handle 9 may be moved about the axis of the bolt in a substantially vertical plane.

On the opposite side of the machine adjacent the rear end of the extension 7 a substantially similar assembly is arranged, namely, a handle 15, having a grip 16, pivoted on a bolt 17 passing through the extension and surrounded by spacer sleeves 18, brackets 19, 20, the latter secured to the extension by a bolt or rivet 21, generally corresponding to the brackets 11, 13, being also provided and disposed in a manner generally similar to the latter so that the handle 15 and attached bracket 19 may be moved about the axis of the bolt in a generally vertical plane.

To the forward inturned ends of the brackets 13, 20 are secured a pair of generally U-shaped members 24, 25, and between them is disposed a transversely extending bar 26 pivoted on a bolt 27 passing through the members; to this bar is welded or otherwise secured a downwardly extend arm 28 carrying an L-shaped extension 29, the overlapping portions of the arm and extension being united by bolts 30 which can be selectively passed through any of a series of holes with which the parts are provided to enable the extension to be adjusted vertically on the bar. The free end of the extension, as best shown in Fig. 3, is adapted for connection with the tool carrying frame as hereinafter described.

It is thus apparent that the bar 26 is capable of oscillation about the bolt 27 between the U-shaped members which serve to guide it in a substantially predetermined plane and that such oscillatory movement is effective to swing the arm 28 and its extension 29 laterally of the machine in one direction or the other; means comprising links 32, 33 respectively extending between the ends of the bar 26 and the adjacent ends of the handles 9, 15 and loosely secured at their extremities in these parts, are provided to enable this movement of the bar to be imparted by moving the handles up and down in opposite directions about their respective pivot bolts. Thus, by depressing the handle grip 10 with corresponding elevation of the handle grip 16, the right hand end of the bar viewed from the rear of the machine can be raised and vice versa so as to move the generally horizontally extending portion of the extension 29 to the right or left with respect to the general line of movement of the machine and correspondingly shift the tool carrying frame to which the extension is connected.

Reference will now be made to the means by which the front end of said frame is interconnected with the mechanism heretofore described, said means being of such character, among other things, that the height of the forward end of the tool carrying frame can be readily adjusted within limits so as to determine the depth of cut taken by the adjacent tools in the surface of the ground.

The tool carrying frame comprises a pair of laterally spaced main bars 40, 41 which for a considerable distance from their forward ends extend in parallel relation, being separated by a space somewhat less than that separating the frame members 1, 1. Near their forward extremities, these main bars are drilled transversely to facilitate their connection with the means now to be described.

At a point considerably in advance of the axis of the wheels 5, two rearwardly extending bars are pivotally connected at their front ends with the side frame members 1, 1 as by pivot bolts 43; these bars, rearwardly of their pivots, are inwardly offset and then extended in parallelism with the members 1, 1 to a point in rear of the said axis. At this point, one of the bars, preferably the bar 44 on the left hand side of the machine, is turned transversely until it meets the other bar 45, and both bars are then extended rearwardly for a short distance and united by rivets 46 so that the two bars in effect form a U-shaped member, pivoted near its front end to the side members and having a rearwardly extending ear 47. To this ear is connected a generally upwardly extending link 48 in turn connected with an arm 49 pivoted at its lower end to the adjacent side frame member and controlled by a rod 50 extending to a control lever 51 pivoted to the frame extension 6 and having a latch 52 cooperative with a notched quadrant 53, also secured to the extension, so that by disengaging the latch and moving the lever in one direction or the other, the bars 44, 45 may be raised and lowered as a unit about their points of pivotal connection with the side frame members.

For receiving the ends of the main frame bars 40, 41, an inverted generally U-shaped yoke 60 is provided which comprises, as best shown in Fig. 4, a flat horizontal central part 60' and depending end portions 60'' adjacent the free ends of each of which are disposed a pair of vertically spaced studs 61 welded or otherwise rigidly secured in place, the inner or free ends of the studs being of suitable diameter to enter the holes in the ends of the frame bars. Thus, each of said bars can be slipped over either the upper or the lower stud as desired when connecting up the tool carrying frame and disposed at a greater or less distance from the ground as desired. For retaining the bars on the studs after they have been engaged therewith, any suitable means are provided such for example, as a U-shaped latch 62 having its middle portion rotatably extended through clips 63 carried by the yoke 60 and its ends depending adjacent but inwardly spaced from the corresponding ends of the yoke. Thus, when the latch is swung up so as to clear its ends from the vicinity of the studs 61, the ends of the tool carrying frame bars can be engaged thereover and will be thereafter held thereon when the latch is allowed to return to normal, that is substantially vertical, position, as best shown in Figs. 4 and 5.

To the middle portion of the yoke 60 is affixed an inverted generally U-shaped member 65 having its central part spaced from the yoke sufficiently to afford room for the reception of an eye 66 formed at the forward end of a bracket 67, the rear ends of which are riveted or otherwise secured to the transversely extending portion of the bar 44 so that the bracket and eye move unitarily therewith. A king bolt 68 carrying a lock nut 69 at its lower end is passed through the member 65, eye 66 and the yoke with the result that these parts can pivot about the axis of the bolt. Thus not only is the requisite draft imparted to the tool carrying frame through the studs 61 and yoke 60, bracket 67 and bars 44, 45, but a capacity for limited oscillation of said frame with respect to the side frame members 1, 1 is afforded through the pivotal mounting of the yoke 60 and member 65 carried thereby, while by manipulation of the control lever 51, the entire assembly formed by the yoke, bars 44, 45, bracket, king pin and forward ends of the tool carrying frame main bars 40, 41, can be raised and lowered for a limited distance with respect to the said side frame members.

The main tool carrying frame to which reference has heretofore been made embodies the main bars 40, 41, each of which at a point somewhat in rear of the tractor wheels, is bent angularly outward as at 40', 41' as the case may be, and thereafter bent inwardly as at 40'', 41'' into substantial parallelism with the forward parts of the bars with the result that the rear end portions thereof are outwardly offset with respect to the front portions and thus respectively lie considerably outside the planes of the adjacent wheels. Between the portions 40'', 41'' is disposed a transversely extending brace 70 which is turned down at its ends and riveted to the bars, gusset plates 71 being desirably provided adjacent the points of juncture of the parts so as to stiffen the entire assembly, the middle part of the brace between its downwardly turned ends being preferably disposed considerably above the plane of the main bars, as best shown in Fig. 1. At the center of the brace is an L-shaped post 72, preferably formed of flat stock one arm of which extends across the brace and is secured thereto while the other projects upwardly therefrom and carries a downwardly and forwardly offset finger 73 whereby a space of sufficient width to receive the end of the L-shaped extension 29 is provided between the face of the post and the finger. Both of these parts as well as the end of the extension are drilled for the passage of a bolt 74 for operatively connecting them together, the arrangement being such that the connection so effected is a fairly loose one so as to permit a limited degree of movement to the extension. If desired, a preferably removable generally U-shaped brace 75 may be disposed between the forward parts of the main frame bars to enhance the rigidity of the assembly.

For affording vertical support to the rear ends of the main bars of the tool carrying frame, a trailer wheel 80 is associated with each bar and connected therewith through the medium of an L-shaped bracket 81, one arm of which is adjustably secured to the bar by a clip 82 so constructed that the bracket may be shifted when the clip is loosened to permit adjustment of the position of the wheel longitudinally and transversely of the machine. Adjacent the lower end of the other and downwardly turned arm of the bracket, the wheel axle 83 is suitably secured and, if desired, the arm may be provided with a plurality of holes for the passage of the axle, thus affording capacity for limited vertical adjustment thereof.

It will of course be appreciated that the main bars of the tool carrying frame are designed to afford support to the standards 85 of ground working tools 86, the standards being secured to the bars through the medium of clips 87 desirably so constructed as to hold them in any position of vertical and longitudinal adjustment upon the bars. The ground working tools may be of suitable design for the particular cultivating operation which is to be performed by the machine and are preferably detachably secured to the standards through the medium of bolts 88 or in any other convenient way so that the same set of standards may be employed with different sets or kinds of tools. Under most conditions, tools of the general character of those illustrated may be satisfactorily employed, such tools comprising a generally vertically extending portion 86' having a sharp leading edge adapted to enter the soil and a rearwardly and generally horizontally extending blade 86'' designed to move more or less parallel with and a short distance below the surface of the ground so as to loosen the soil, tools of this general character being well known and in common use.

As hereinafter more fully explained, the machine as heretofore described may be readily adjusted for the cultivation of one row of plants but as it is frequently desired to cultivate a plurality of rows simultaneously, means are provided whereby the ground working tools may be readily arranged for that purpose, such means comprising auxiliary bars 90 disposed on opposite sides of the machine, secured to the main bars of the tool carrying frame, and lying in the same horizontal plane as the latter. More particularly, each of these bars, which are formed of flat stock of the same dimensions as the main bars, comprises a portion 90' lying in parallel relation with the rear part 40'' or 41'' of the adjacent side bar and bolted thereto, and an angularly outwardly directed portion 90'' preferably extending at the same but opposite angle to the longitudinal center line of the machine as the adjacent angularly disposed portion of the side bar; these parts thus form a Y-shaped structure opening toward the front of the machine as best shown in Fig. 2.

Reference will now be made to the manner of adjusting and operating the machine preparatory to and during simultaneous cultivation of three substantially parallel rows of plants and then to its adjustment and use when cultivating but one row of plants: The tool carrying frame, conveniently supported on the trailer wheels 80, is first connected to the yoke 60 by lifting latch 62 and engaging the projecting ends of the studs 61 in the holes adjacent the forward ends of the main bars 40, 41, that set of studs being selected which will bring the forward ends of the bars to approximately the desired height, and the latch 62 is then allowed to drop back to substantially vertical position so as to hold the ends of the bars to the yoke. Three pairs of ground working tools and standards are then attached to the main and auxiliary bars of the tool carrying frame and respectively adjusted so they will enter the ground to approximately the desired depth and operate on each side of the three rows which are to be cultivated. Thus, as best shown in Fig. 2, a pair T of the said tools are respectively secured to the main bars adjacent the forward ends of the angularly disposed parts 40', 41' thereof in such relation to each other that the space between the blades of this pair of tools will accommodate the plants in the middle row; another pair T' are respectively attached to the parts 40', 90'' of that portion of the frame lying on the right hand side of the machine, and the third pair T'' similarly attached to the corresponding parts on the left hand side, the tools of each such pair being so adjusted that the space between them will accommodate the row of plants lying to the right or left of the center row as the case may be. The trailer wheels are then adjusted so that they will respectively track outside the last mentioned rows and, if necessary, adjusted in height so as to maintain the frame in approximately horizontal position, and the extension 29 then connected with post 72.

It will of course be appreciated that under modern agricultural conditions, plants of the character of those intended for cultivation by the machine are planted in parallel rows at equal distances apart, for example, twelve inches. Thus referring to Fig. 6 and considering first the rows R, R1, R2 as those which are to be initially cultivated, the various adjustments of the tools and trailer wheels to which reference has been made are so effected that the tools T will lie on opposite sides of and closely adjacent the row R and the tools T', T'' will be respectively similarly disposed with regard to the rows R1, R2, while the wheels 80 will respectively lie slightly outside the latter. The machine being then brought into proper relation with the rows and set in motion in the direction of the arrow in said figure, cultivation of the three rows will be simultaneously effected as the machine crosses the field. When the end thereof is reached and the machine reversed in direction, it will then operate on the next adjacent set of rows R3, R4, R5 in a corresponding manner. By suitable manipulation of lever 51, the height of the front end of the tool carrying frame and adjacent tools may be controlled so as to cause the said tools to enter the ground to the proper depth, while by moving the handles 9, 15 laterally and/or depressing one or the other of the handle grips 10, 16, the machine can be steered and the tools caused to properly follow any sinuosities in the rows since the tool carrying frame on one hand and the ground wheels 5, 5 on the other are capable of limited swinging movement with respect to each other about the axis of the king bolt 68. By reason of the lateral offsetting of the handle 15, the operator normally walks to the left of the center row on that portion of the ground or "balk" lying between it and row R2, and thus out of the way of both rows, as from this position he can guide and control the machine more accurately and to better advantage than if he followed it approximately on the line of the center row.

Because of difficulty in handling, excessive weight, and other factors, a cultivating implement of the general character of that to which my invention relates is necessarily restricted in size, and therefore cannot ordinarily be built large enough to cultivate more than three rows at a time, assuming the said rows are spaced more than 18 inches or so apart. However, when the outermost pairs of tools T', T'' and the trailer wheels are suitably adjusted to bear the proper relation to the outermost rows, a machine constructed in accordance with my invention may be readily and satisfactorily employed for the cultivation of three rows at a time where the maximum distance between them does not materially exceed this amount. Under these conditions, that is, when rows are set widely apart, the tools on the auxiliary bars 90 are normally moved to a point more closely adjacent the front ends of the bars than is shown in Fig. 2, and the corresponding tools on the main bars moved farther to the rear thereon than as shown in said figure. The tools of each pair T', T'' instead of being transversely aligned will thus lie in longitudinally staggered relation, the tool on the main bar being somewhat behind that on the auxiliary bar. In fact, because of the novel construction and arrangement of the tool carrying frame, it is possible to adjust the various tools which it is designed to support to accommodate almost any arrangement or spacing of rows within the maximum width which can be included between the outermost tools of the pairs T', T'' when they are set substantially at the ends of the auxiliary bars, and it is thus possible to utilize the implement for the satisfactory cultivation of a plurality of rows of plants under substantially any condition of spacing or arrangement normally encountered.

Moreover, as indicated in Fig. 7, it is equally feasible to employ the machine for the cultivation of but one row at a time. To this end, the tools T are set substantially as hitherto described, another pair of tools Ta is arranged about midway of the inclined portions 40', 41' of the main frame bars, and still another pair Tb adjacent the rear end thereof, the trailer wheels being preferably moved up and secured to the frame bars ahead of the last mentioned pair of tools; if preferred, the auxiliary bars 90 may also be removed since no tools are now attached thereto. Under these conditions, when the implement is moved first along the row Ra, the soil lying on both sides thereof will be thoroughly agitated over a considerable area, and when the machine is reversed in direction, similar agitation of the soil adjacent row Rb will be effected, thus thoroughly cultivating substantially all of the ground forming the balk between the two rows when the latter are not spaced an excessive distance apart. Thus, for example, with 30 inch spaces between the rows, substantially all of the soil lying between them will be agitated during a forward and reverse movement of the machine across the field, as will readily be apparent from an inspection of Fig. 7.

It will be apparent that irrespective of whether the machine be adjusted for simultaneous cultivation of a plurality of rows as shown in Fig. 6 or of one row as shown in Fig. 7, the leading tools T are disposed relatively close to the point at which the tool carrying frame is attached to the yoke 60 carried by the main frame, while the following comparatively widely separated tools T' and T'' or Tb, as the case may be, are located relatively close to the trailer wheels 80 and their respective depths of cut in the ground thus determined thereby. Since a certain amount of relative movement can take place between the main frame and the tool carrying frame by reason of their somewhat loose connection, a substantially equal depth of cut is therefore taken by the following tools, even though the machine is passing over somewhat uneven ground, for each trailer wheel lying at a point relatively remote from the center line or row can follow local irregularities, thus keeping the tools adjacent thereto at the proper depth, while the tools T adjacent the middle row are similarly raised or lowered to follow the ground wheels 5. In this respect, the present machine presents a distinct advantage over others heretofore proposed in which the tools are arranged on more or less rigid transversely extending bars so connected with the other parts of the machine that when traveling over uneven ground the tools adjacent one end of the bar tend to cut into the soil more deeply than they should, and those adjacent the other end less deeply with consequent unequal cultivation of the area traversed by the machine. On the contrary, since in accordance with the present invention the tools are disposed substantially at the corners of a triangle and locally supported with relation to the ground surface in their vicinity, a substantially constant depth of cut by all the tools can be maintained even though the machine be traveling over uneven ground.

A machine constructed in accordance with my invention is therefore substantially of universal application in the cultivation of successive rows of plants since by suitable adjustment of the various tools and trailer wheels, it may be readily adapted to virtually any spacing of the rows, while irrespective of what said adjustment may be, a substantially constant depth of cut can be maintained and the direction of movement of the machine and cultivating tools be controlled by the operator with the requisite nicety and exactness for satisfactory cultivation and avoidance of injury to the plants. Moreover, the various parts are of such design as to negative the liability of breakage or damage under the conditions of use to which they are necessarily subjected, while the machine as a whole is comparatively simple and readily operable by ordinary farm or like labor.

While I have herein illustrated and described one embodiment of my invention with considerable particularity, I do not thereby desire or intend to specifically limit or confine myself thereto as numerous changes and modifications may be made in the form, construction and arrangement of the various elements and/or in the manner of assembly without departing from the spirit and scope of the invention as defined in the appended claims.

Having thus described my invention, I claim and desire to protect by Letters Patent of the United States:

1. A tool carrying frame for an agricultural implement comprising a pair of laterally spaced main bars, each bar having a front end portion arranged in parallelism with the corresponding portion of the other bar, an angularly outwardly directed intermediate portion and a rear end portion also in parallelism with the corresponding portion of the other bar, a cross member uniting said bars, and auxiliary bars secured to said rearwardly extending portions and outwardly directed thereof at an angle approximating but opposite to that formed by the angularly directed intermediate portions of the main bars with the mutually parallel portions thereof.

2. A tool carrying frame for an agricultural implement comprising two laterally spaced main bars each having a rearwardly extending portion lying in parallel relation with the corresponding portion of the other bar, an inwardly angularly directed intermediate portion in advance of the rear portion, and a front portion parallel with the rear portion, a cross member connecting said bars, and auxiliary bars each having a portion rigidly secured to the front part of the rear portion of each main bar and an outwardly angularly directed portion projecting forwardly and outwardly therefrom at substantially the same angle at which the intermediate portion of the adjacent main bar is inwardly directed.

3. In an agricultural implement comprising a main frame having laterally spaced side members and a tool carrying frame having laterally spaced forwardly extending bars, means for detachably securing said bars to said frame comprising a member pivoted for vertical movement between the main frame members, a king bolt supported from said pivoted member, a yoke rotatable about the axis of the bolt having depending arms, a stud extending between each yoke arm and each of said forwardly extending bars providing a separable connection therebetween, and a movable latch operative when in normal position to maintain said connection.

4. In an agricultural implement comprising a main frame having laterally spaced side members and a tool carrying frame having forwardly projecting laterally spaced main bars provided with holes adjacent their front ends, means for detachably connecting said bars to said main frame comprising a U-shaped member pivoted between said side members for vertical movement and extending rearwardly from its points of pivotal support, a bracket carried by said member and providing an eye, a king bolt received in said eye, a yoke supported by the bolt for limited horizontal rotation about the axis of the bolt and provided with depending arms, studs adjacent the extremities of said arms for reception in the holes in said main bars, latching means for holding the bars in engagement with the studs, and means carried by the frame for moving the U-shaped member about its pivots and holding it in predetermined adjusted position with respect to the main frame.

5. In an agricultural implement of the class described comprising a main frame, supporting ground wheels, and a tool carrying frame having forwardly extending bars, a yoke supported from the main frame having downwardly depending laterally spaced arms and means for detachably securing said bars respectively to said arms comprising a stud carried by one of said parts and detachably engageable by the other to form a separable connection therebetween, and a movable latch operative when in normal position to maintain said engagement but movable to another position to enable said parts to be separated.

6. In an agricultural implement of the class described comprising a main frame, supporting ground wheels, and a tool carrying frame having forwardly extending bars, a yoke supported from the main frame having downwardly depending laterally spaced arms and means for detachably securing said bars respectively to the arms of the yoke comprising a stud extending between each arm and the adjacent frame bar providing a separable connection therebetween, and movable means operative when in one position to maintain said connection and when in another position to permit the bar to be separated from the arm.

CHARLES J. ALLEN.